United States Patent
Ishio et al.

(10) Patent No.: US 7,476,846 B2
(45) Date of Patent: Jan. 13, 2009

(54) RADAR DEVICE AND MEMS MIRROR DEVICE THEREFOR

(75) Inventors: Wataru Ishio, Owari Asahi (JP); Ryoji Fujioka, Kasugai (JP)

(73) Assignee: OMRON Corporation, Kyoto (JP)

( * ) Notice: Subject to any disclaimer, the term of this patent is extended or adjusted under 35 U.S.C. 154(b) by 74 days.

(21) Appl. No.: 11/657,919

(22) Filed: Jan. 24, 2007

(65) Prior Publication Data

US 2007/0222678 A1    Sep. 27, 2007

(30) Foreign Application Priority Data

Mar. 15, 2006   (JP)   ............................. 2006-071209
Nov. 20, 2006   (JP)   ............................. 2006-313087

(51) Int. Cl.
   *H01J 3/14*   (2006.01)
   *H01J 5/16*   (2006.01)
   *H01J 40/14*   (2006.01)

(52) U.S. Cl. ........................ 250/234; 250/235; 250/236

(58) Field of Classification Search .......... 250/234–236
   See application file for complete search history.

(56) References Cited

U.S. PATENT DOCUMENTS

2005/0213978 A1 *   9/2005   Yamashita et al. ............ 398/79

\* cited by examiner

*Primary Examiner*—Seung C Sohn
(74) *Attorney, Agent, or Firm*—Weaver Austin Villeneuve & Sampson LLP

(57) ABSTRACT

A radar device includes a light projecting part that generates laser light, a light projecting lens that converges the generated laser light to form a beam, a reflective mirror for reflecting the converged beam to project it in a specified search direction and for reflecting returning light from this search direction, a light receiving lens for converging the returning light reflected by the reflective mirror, and a scanning part for moving the beam in a scanning manner. There are two light receiving parts which are different in photosensitivity, and a synthesizing part outputs a synthesized signal formed by synthesizing output signals from these two light receiving parts.

19 Claims, 7 Drawing Sheets

RADAR DEVICE AND MEMS MIRROR DEVICE THEREFOR

This application claims priority on Japanese Patent Applications 2006-071209 filed Mar. 15, 2006 and 2006-313087 filed Nov. 20, 2006.

BACKGROUND OF THE INVENTION

This invention relates to a radar device for projecting a near-infrared laser beam forward and measuring the distance to an object by observing its reflected light, as well as an MSMS mirror device that is appropriate therefor.

Radar devices for projecting a near-infrared laser beam forward to monitor the presence of objects such as a front going vehicle, pedestrians and obstacles and to measure their distances and directions by observing its reflected light are coming to be used popularly in recent years. Conventionally, a PIN-type photodiode was commonly used as the light receiving element for receiving the reflected light. Since PIN photodiodes have a low S/N ratio and the sensitivity cannot be made high, there was a limit to the detection of reflected light with low brightness being returned from a distant or black object.

For this reason, Japanese Patent Publication Tokkai 11-160432, for example, disclosed a radar device using a photodiode called avalanche photodiode (hereinafter referred to as APD), which has a high S/N ratio and high sensitivity and is capable of detecting reflected light with low brightness. An APD is usually inserted into a reverse bias circuit and can operate with high sensitivity if the bias voltage is increased.

Japanese Patent Publication Tokkai 11-288444, on the other hand, proposed a bar code scanner for using projected light from a laser diode and reading reflected light from a target object, providing integrally a mobile part of its scanning means with reflecting means and light detecting means by a semiconductor process.

Objects may be present in front of an automobile at different distances from very near to very far and they are widely different in reflectivity. Thus, if a radar device is to serve as a monitor for the forward direction, its dynamic range for the reflected light to be monitored is required to be extremely wide.

In general, a photodiode becomes saturated by an input with high brightness and is not capable of detecting an input with low brightness below the noise level of the element. Thus, if its light receiving sensitivity is increased, incident light with low brightness may become detectable but it becomes saturated with input light with high brightness. If the sensitivity is reduced such that incident light with high brightness can be observed, on the other hand, incident light with low brightness sinks below the noise level.

It is therefore an object of this invention to provide a radar device capable of accurately measuring the position of an object even if reflected light has a wide dynamic range and an MEMS mirror device that can be applied to such a radar device.

SUMMARY OF THE INVENTION

A radar device according to one embodiment of this invention may be characterized as comprising a light projecting part that generates laser light, a first light receiving part that converts received light into a signal, an optical system that uses an MEMS mirror and serves to form the laser light generated by the light projecting part into a beam, to project this beam in a specified search direction, to receive reflected light from this search direction and to lead the received light to the first light receiving part, this MEMS mirror having a semiconductor substrate with a surface that is mirror-finished by a semiconductor process and at least one photodiode on this surface, a second light receiving part including the aforementioned at least one photodiode formed on the MEMS mirror and having a photosensitive range for reflected light with higher brightness than the photosensitive range of the first light receiving part, and a synthesizing part that outputs a synthesized signal formed by synthesizing outputs from the first light receiving part and the second light receiving part.

With a radar device thus structured, reflected light is observed by the first and second light receiving parts which have different active ranges. The output signal from the second light receiving part having a photosensitive range for incident light with higher brightness and the output signal from the first light receiving part having a photosensitive range for incident light with lower brightness are combined by the synthesizing part to obtain a synthesized signal having a widened dynamic range. Thus, even if incident light has a very wide dynamic range, the position of an object can be measured accurately from this synthesized signal.

With a radar device thus structured, furthermore, the positioning of the two light receiving elements is simplified since the light receiving elements of the second light receiving part are formed on the mirror.

An MEMS mirror device according to this invention may be characterized as comprising a semiconductor substrate having a surface with areas arranged in a matrix form, a plurality of semiconductor elements each formed by a semiconductor process as a mirror element with a mirror surface in different one of these areas, and at least one photodiode each at different one of these areas. Such a device, when seen as a whole, is a mirror but the quantity of light reflected by this mirror can be observed by the one or more photodiodes on this mirror.

Another radar device according to another embodiment of this invention may be characterized as comprising a light projecting part that generates laser light, a first light receiving part that converts received light into a signal, an optical system that uses an MEMS mirror of this invention as described above and serves to form the laser light generated by the light projecting part into a beam, to project this beam in a specified search direction, to receive reflected light from the search direction and to lead the received light to the first light receiving part, a second light receiving part including the aforementioned at least one photodiode formed on the MEMS mirror and having a photosensitive range for reflected light with higher brightness than the photosensitive range of the first light receiving part, and a synthesizing part that outputs a synthesized signal formed by synthesizing outputs from the first light receiving part and the second light receiving part.

With a radar device of this embodiment, too, reflected light is observed by the first and second light receiving parts which have different active ranges. The output signal from the second light receiving part having a photosensitive range for incident light with higher brightness and the output signal from the first light receiving part having a photosensitive range for incident light with lower brightness are combined by the synthesizing part to obtain a synthesized signal having a widened dynamic range. Thus, even if incident light has a very wide dynamic range, the position of an object can be measured accurately from this synthesized signal.

In the above, the second light receiving part may include an avalanche photodiode and each photodiode of the first light receiving part may be a PIN diode. Avalanche diodes are far more photosensitive than PIN photodiodes adapted to convert incident light into an electric current by the Hall effect. Thus, if output signals from these photodiodes are combined by the synthesizing part, it is possible to obtain a synthesized signal even if incident light has a very wide dynamic range.

The radar device of this invention may be further characterized as comprising means for driving the MEMS mirror device to thereby cause the search direction to oscillate. The search direction of the radar device can be changed if the mirror surface is thus oscillated periodically.

The radar device may also comprise means for causing each of micro-mirror elements of the MEMS mirror device to oscillate to thereby cause the search direction to oscillate. Such aspects of the invention may be variously combined to carry out two-dimensional scans.

A radar device of this invention may be further characterized as comprising a light projecting part that generates laser light, a light projecting lens that converges the laser light generated by the light projecting part to form the generated laser light into a beam, a reflective mirror for reflecting the converged laser light formed into the beam to thereby project the beam in a specified search direction and for reflecting returning light from this search direction, a light receiving lens for converging the returning light reflected by the reflective mirror, a scanning part having a mobile part and serving to move the beam in a scanning manner by driving the mobile part, a first light receiving part for receiving the returning light converged by the light receiving lens and converting the received returning light into a signal, a second light receiving part including at least one photodiode formed on the reflective mirror and serving to receive the returning light from the search direction and to convert the received returning signal into a signal, and a synthesizing part that outputs a synthesized signal formed by synthesizing output signals from the first light receiving part and the second light receiving part.

The radar device thus characterized serves to scan a target area by reflecting the beam of projected light by the reflective mirror which is structured as described below such that its reflective surface will undergo an oscillating motion. The first light receiving part serves to observe reflected light returning from an object collected by the light receiving lens. The second light receiving part serves to receive light with the photodiodes set on the reflective mirror without converging it. The output signals from the first and second light receiving parts are combined by the synthesizing part to obtain a synthesized signal with a wide dynamic range.

In the above, the second light receiving part has a photosensitive range for the returning light with higher brightness than the photosensitive range of the first light receiving part. In other words, the reflected light is observed according to this invention by two light receiving parts having different active ranges such that the output signal from the second light receiving part which is photosensitive to incident light with lower brightness and the output signal from the first light receiving part which is photosensitive to incident light with higher brightness are synthesized by the synthesizing part.

The reflective mirror may be an MEMS mirror comprising a semiconductor substrate having a surface that is mirror-finished by a semiconductor process and the aforementioned at least one photodiode. The reflective mirror may alternatively be an MEMS mirror comprising a semiconductor substrate having a surface with areas arranged in a matrix form, a plurality of semiconductor elements each formed by a semiconductor process as a mirror element with a mirror surface in different one of these areas, and the aforementioned at least one photodiode each at different one of these areas. Each of these devices is a mirror as a whole but the quantity of light reflected thereby can be observed by the photodiode (or photodiodes) set thereon.

The scanning part moves the beam by causing the mirror elements of MEMS mirror to oscillate such that the target area can be scanned. In other words, it is not required to move the mirror surface as a whole. It also goes without saying that a two-dimensional scan may be effected.

According to a preferred embodiment of the invention, the first light receiving part includes an avalanche photodiode and each of the photodiodes formed on the reflective mirror is a PIN diode. A PIN diode converts incident light into an electric current by the Hall effect, while an avalanche photodiode (APD) converts incident light into an electric current by the so-called electronic avalanche effect and is far more sensitive than PIN photodiodes. Thus, the positions of target objects can be accurately measured by synthesizing output signals from light receiving parts having these two kinds of photodiodes.

In the above, the synthesizing part compares the value of the output signal from the first light receiving part and a multiplied value of the output signal from the second light receiving part and determines a reverse bias voltage to be applied to the avalanche photodiode for making the value of the output signal from the first light receiving part to become equal to the multiplied value. According to this invention, the value of the output signal from the first light receiving part (or the output from the APD) and a multiple of the output signal from the second light receiving part (or the output from the PIN photodiode) are compared. Since the first light receiving part receives returning light converged by the light receiving lens while the second light receiving part receives returning light without converging it, the quantity of received light by the second light receiving part is smaller than that by the first light receiving part. This is why the output signal from the second light receiving part is multiplied according to the sensitivity set for the second light receiving part (for example by 16 if the sensitivity of the second light receiving part is $1/16$) in order to equalize the values of the output signals. The reverse bias voltage for the APD is determined such that the compared values will become equal. Since the photosensitivity of the APD varies sensitively according to the temperature, if the compared values are different, it may be concluded that it was due to the change in the photosensitivity of the APD caused by a temperature variation and the temperature compensation can be effected by calculating the reverse bias voltage that would cause these the two values to become equal.

According to another aspect of the invention, the light receiving lens has a light receiving area that is larger than the light receiving area of the aforementioned at least one photodiode. It is so as to improve the photosensitivity by causing more reflected light to be made incident to the first receiving part. Thus, it is preferable to make the light receiving lens capable of receiving all of the reflected light from the reflective mirror.

According to still another aspect of the invention, the light receiving lens is characterized as having a light receiving area that is larger than the light receiving area of the light projecting lens. It is because the light projecting lens needs only to be large enough to receive the laser light projected from the light projecting part formed as a beam.

In summary, the present invention makes it possible for the light-reflecting mirror itself to observe the quantity of light reflected thereby. Moreover, since output signals from two light receiving parts having different ranges in photosensitivity are synthesized, both objects that are low and high in brightness can be accurately and simultaneously observed.

DETAILED DESCRIPTION OF THE INVENTION

Figure 1A:
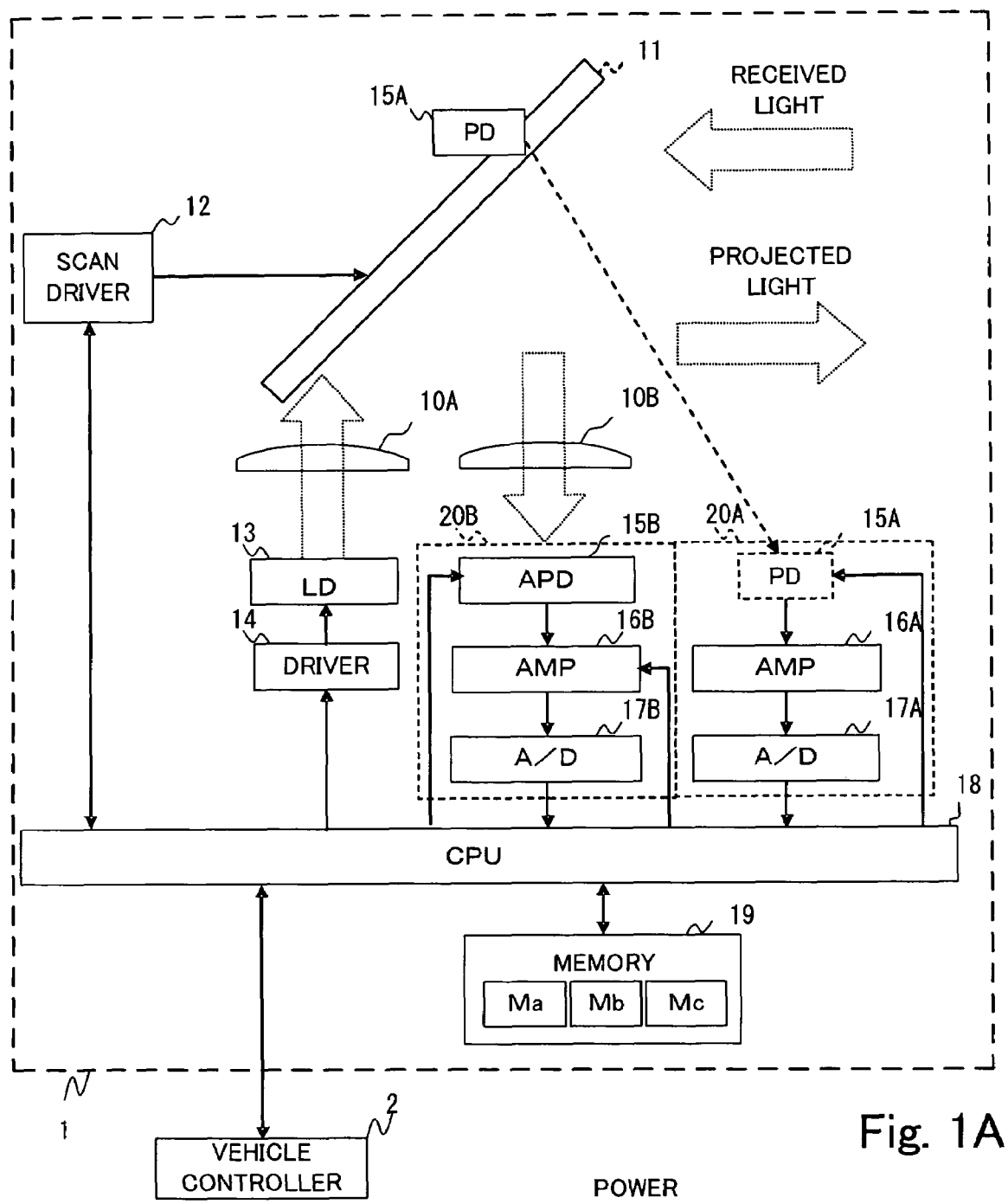
FIG. 1A is a block diagram of a radar device of this invention.

FIG. 1A is a block diagram for showing the structure of a radar device 1 of this invention, provided with a light projecting lens 10A, a light receiving lens 10B, a reflective mirror 11, a scan driver 12, a laser diode (LD) 13, a driver 14, (first and second) light receiving circuits 20A and 20B, a CPU 18 and a memory 19.

The light projecting and receiving lenses 10A and 10B are affixed to a same frame such that their optical axes are parallel to each other. The laser diode 13 is set at the focal point of the light projecting lens 10A, and an APD 15B is set at the focal point of the light receiving lens 10B.

Figure 2:
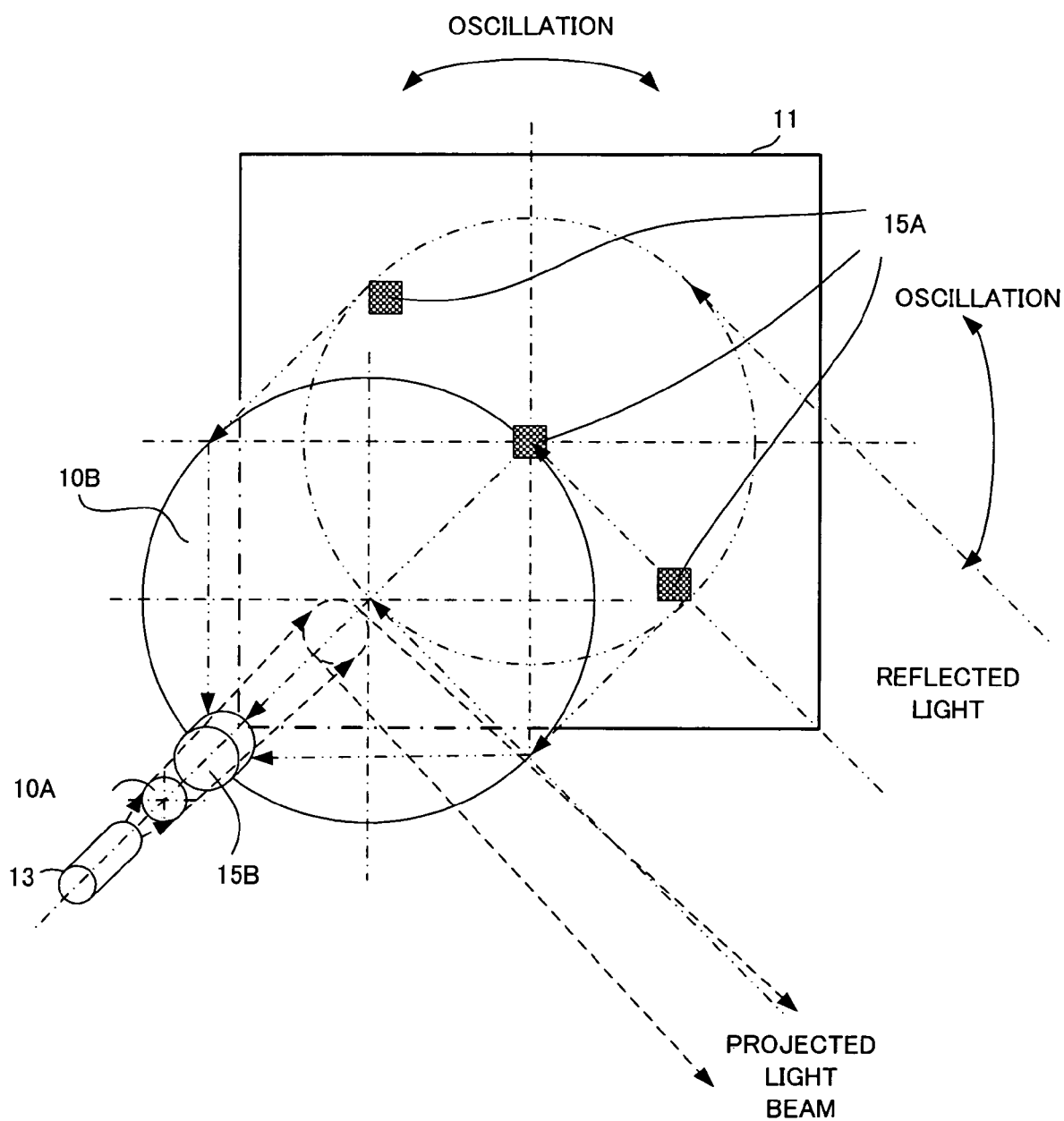
FIG. 2 is a schematic drawing for showing the manners of projecting and receiving light by the radar device.

The laser diode 13 is driven by the driver 14. The driver drives the laser diode 13 according to outputs from the CPU 18. The laser light from the laser diode 13 is projected in the form of a beam (as shown in FIG. 2) by means of the light projecting lens 10A. This infrared beam of light is reflected by the reflective mirror 11 and projected outward. As this infrared light is made incident to a target object, its reflection (returning light) comes back to the radar device (as shown in FIG. 2). This reflected light is received by the second light receiving circuit 20B through the reflective mirror 11 and the light receiving lens 10B. The field of vision of this light receiving circuit 20B is narrowed down in the form of a beam by means of the light receiving lens 10B.

The reflective mirror 11 is driven by the scan driver 12 so as to rotate reciprocatingly within a specified angular range such that the direction of the infrared projection beam generated by the laser diode 13 and the direction of the light received by the second light receiving circuit 20B (the search direction) will oscillate within a specified range of search angles to carry out a scan.

In this example, the reflective mirror 11 is an MEMS mirror produced by the technology of MEMS (micro electro-mechanical systems), or by vapor deposition of a reflective film of gold or aluminum on the surface of a semiconductor substrate by a semiconductor process.

Figure 3A:
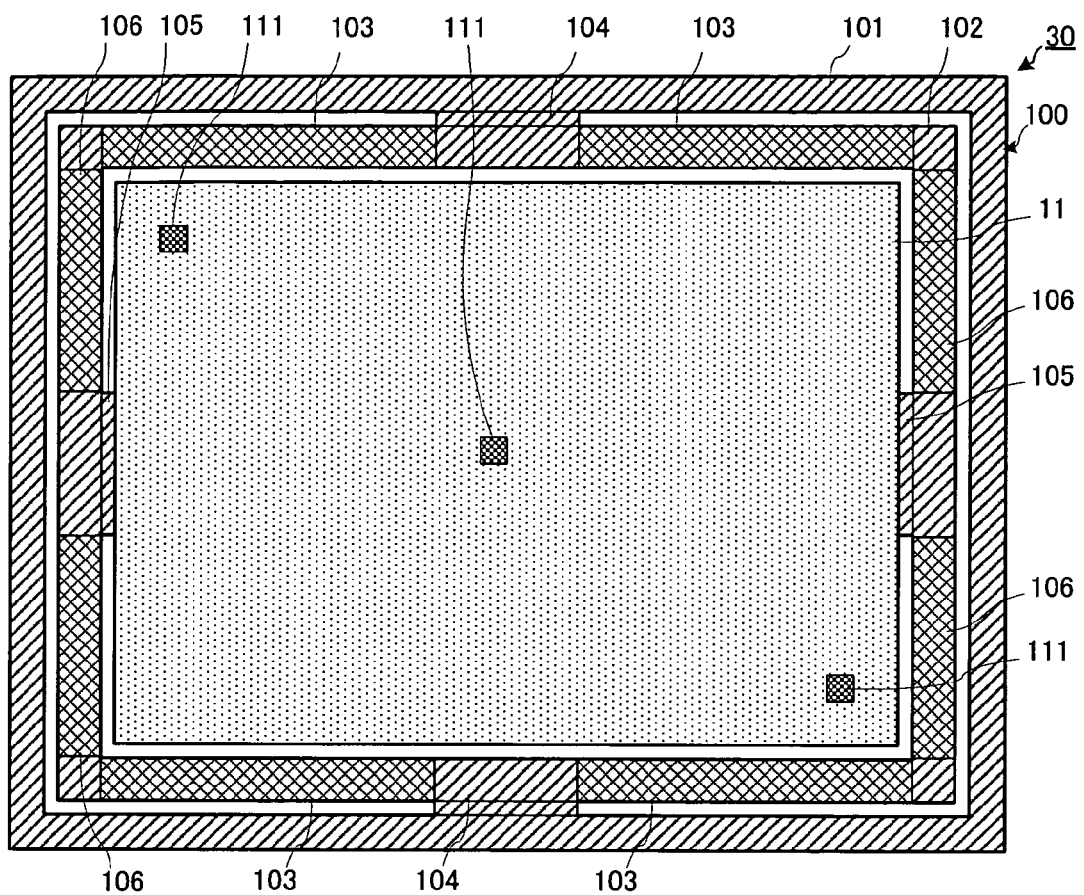
FIGS. 3A and 3B are schematic drawings for showing the structures of MEMS mirrors used as reflective mirror of the optical system.

FIG. 3A shows the structure of the reflective mirror 11, or an MEMS mirror device 30 produced from a semiconductor substrate by the MEMS technology. The mirror main body 11 is supported by a frame 100 of a gimbal structure so as to be free to oscillate. The frame 100 includes a fixed frame 101 which is on the external peripheral side and serves to support the mirror as a whole and a mobile frame 102 which is deformed by means of piezoelectric elements 103 to cause the mirror main body 11 to oscillate. The fixed frame 101 and the mobile frame 102 are connected through rotary shafts 104 so as to be rotatable with respect to each other. The mobile frame 102 and the mirror main body 11 are connected through linkage mechanisms 105. The piezoelectric elements 103 of PZT or the like are formed on both sides of each of the rotary shafts 104 on the upper and lower sides of the mobile frame 102. Piezoelectric elements 106 of PZT or the like are formed similarly on both sides of the linkage mechanisms 105 on the left and right hand sides of the mobile frame 102.

If an appropriate voltage is applied to the piezoelectric elements 103, the upper and lower sides of the mobile frame 102 are bent by the piezoelectric effect and its right-hand and left-hand sides move in the directions into and out of the page. As a result, the mirror main body 11 rotates (to the left and to the right) around the shafts 104. If an appropriate voltage is applied to the piezoelectric elements 106, the right-hand and left-hand sides of the mobile frame 102 are twisted by the piezoelectric effect, and since the linkage mechanisms 105 rotate due to this twist, the upper and lower sides of the mirror main body 11 move in the directions out of and into the page such that the mirror main body 11 rotates around the linkage mechanisms 105. In other words, the reflective mirror 11 functions as a two-dimensional scanning means.

The scan driver 12 is a circuit for controlling the voltages to be applied to the piezoelectric elements 103 and 106. A triangular wave of 50 Hz is applied to the piezoelectric elements 103 for oscillating in the left-right search direction. A sawtooth-shaped wave of from 1 to several Hz is inputted to the piezoelectric elements 106 for moving the position of the left-right scan from the top to the bottom.

In the above, however, a two-dimensional scan is not essential. The piezoelectric elements 106, for example, may be dispensed with and the scan may be carried out only in the left-right direction. Alternatively, the horizontal and vertical scans may be carried out simultaneously for an elliptical scan or for tracing a Lissajous' curve.

As shown, the MEMS mirror device 30 has minute PIN photodiodes 111 formed in the mirror main body 11 by a semiconductor process. These PIN photodiodes 111 are used as light receiving elements for reflected light.

Figure 3B:
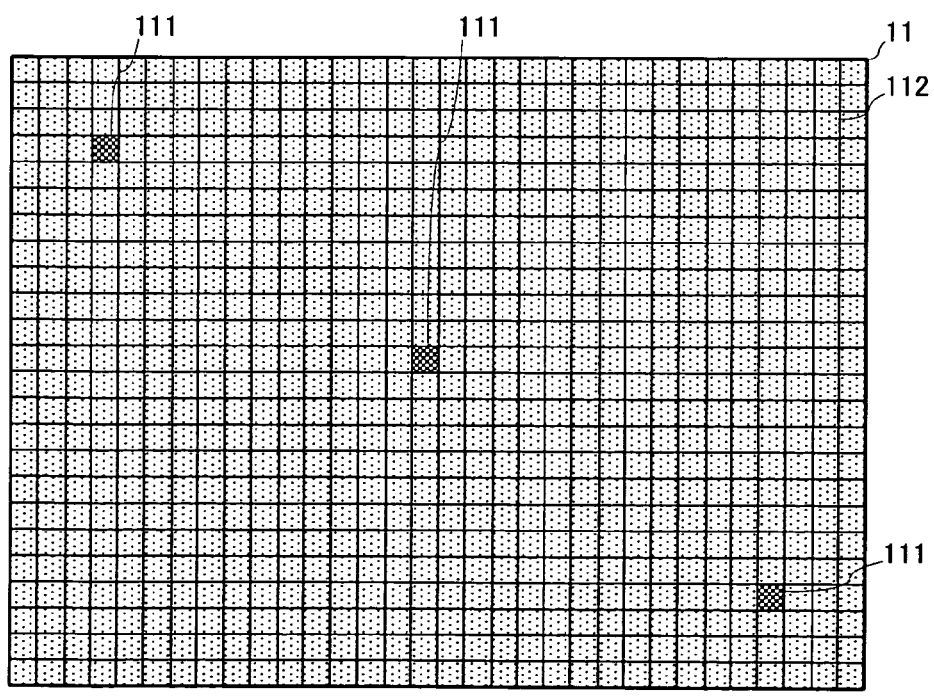

The reflective mirror 11 need not necessarily be formed as an MEMS mirror of a single-sheet structure. As shown in FIG. 3B, a plurality of micro-mirror elements 112 may be arranged in a matrix formation to form a reflective mirror as a whole. In this case, one or more of these micro-mirror elements 112 are replaced by PIN photodiodes 111. The above, however, does not mean that a reflective mirror is initially formed with nothing but micro-mirror elements, one or more of them being thereafter removed and each replaced by a PIN photodiode. It simply means that a PIN photodiode is formed at one or more of the places in the matrix formation. The number and positions of the PIN photodiodes 111 to be formed are arbitrary. A plurality of PIN photodiodes may be formed and the number of them to be used may be selected according to the quantity of received light. PIN photodiodes may be formed at various places and the average of their outputs may be taken.

The first light receiving circuit 20A comprises the aforementioned PIN photodiodes (PD) 15A, an amplifier 16A and an A/D converter 17A. The second light receiving circuit 20B comprises the aforementioned APD 15B, an amplifier 16B and an A/D converter 17B. Each of the PD 15A and APD 15B used in the light receiving circuits 20A and 20B has sensitivity in the infrared range, being sensitive to the reflection of the infrared laser light projected from the laser diode 13.

As shown in FIG. 2, reflected light from a target object is reflected by the reflective mirror 11 and converged by the light receiving lens 10B to be made incident on the APD 15B (of the second light receiving circuit 20B). Thus, it can receive more reflected light than the PD 15A (of the first light receiving circuit 20A). In other words, more reflected light can be made incident onto the APD 15B which is more sensitive than the PD 15A and hence the sensitivity can be even more improved. In order to improve the detection sensitivity for the target object, it is preferable to make the effective diameter of the light receiving lens 10B such that the reflected light from the reflective mirror 11 can be all collected to the second light receiving circuit 20B. As for the light projecting lens 10A, since its function is to form a beam of a specified form from the laser light from the laser diode 13, it is sufficient if its effective diameter is large enough to collect the laser light from the laser diode 13. Thus, the light projecting lens 10A may be smaller than the light receiving lens 10B.

Figure 1B:
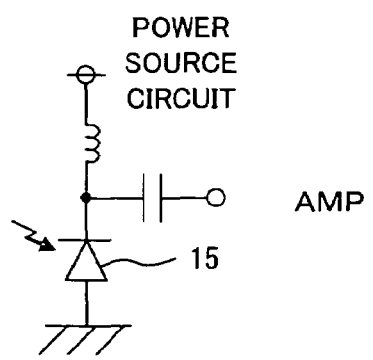
FIG. 1B is a circuit diagram for showing the electrical connection of photodiodes.

FIG. 1B shows the electrical connection of the photodiode 15 (PD 15A or APD 15B). This is a reverse bias circuit, the photodiode 15 having its cathode connected to a power source circuit controlled by the CPU 18 and its anode connected to the ground. The power source circuit is for generating a positive voltage with respect to the ground, and a reverse bias voltage is applied to the photodiode 15. The voltage generated by the PD 15A from incident light is inputted to the amplifier 16A through a capacitor. The voltage that is generated by the APD 15B is inputted to the amplifier 16B through a capacitor. The output voltage signal from PD 15A amplified by the amplifier 16A is converted by the A/D converter 17A into a digital signal and inputted to the CPU 18. The output voltage signal from the avalanche diode 15B amplified by the amplifier 16B is converted by the A/D converter 17B and inputted to the CPU 18.

This reverse bias circuit serves to apply a reverse bias voltage somewhat lower than the breakdown voltage to the photodiode 15 (that is PD 15A or APD 15B) such that if a photo-voltage due to incident light with a specified quantity of light is added to the reverse bias voltage, the total voltage will exceed the breakdown voltage. If the total voltage exceeds the breakdown voltage, there results a breakdown (or the avalanche phenomenon in the case of the APD) and a voltage generated by a current according to the quantity of received light is applied to the amplifier.

The amplifiers 16A and 16B are variable-gain amplifiers, amplifying the output currents of the PD 15A and the APD 15B by a gain set by the CPU 18.

The A/D converters 17A and 17B serve to convert (normalize) the amplified outputs of the amplifiers 16A and 16B into digital outputs in specified gradations (such as 256 gradations). These A/D converters 17A and 17B set the output level corresponding to the largest of these specified gradations (such as 255) at the saturation level of the element (or the upper limit of the range in which the amplifier output shows a linear relationship with respect to the quantity of received light) or at a practically conceivable upper limit of the quantity of received light and the level corresponding to the minimum value (of zero) as the threshold level (or the level at which the presence of an object in front of the automobile can be judged). Specifically, this is done by detecting the quantity of received light with the CPU 18 several times when light is not being projected, obtaining a threshold level by adding their average to a multiple (by a constant factor) of their standard deviation and setting it to the A/D converters 17A and 17B.

The CPU 18 is connected to the light receiving circuits 20A and 20B, the scan driver 12, the driver 14, the memory 19 and a vehicle controller 2. The CPU 18 provides instructions regarding the angle of oscillation to the scan driver 12 and instructions on the intensity of projected light to the driver 14. The CPU 18 controls the active ranges of the light receiving circuits 20A and 20B and in particular the saturation levels of the PD 15A and the APD 15B by adjusting the reverse bias voltage. The CPU 18 also controls the active ranges of the light receiving circuits 20A and 20B by adjusting the gains of the amplifiers 16A and 16B. The active range of a light receiving circuit is determined as the range from the noise level of its photodiode and amplifier to its saturation level.

The CPU 18 serves to temporarily store the digital signals received from the light receiving circuits 20A and 20B at a plurality of memory areas Ma-Mc of the memory 19 and to generate synthesized signals with a wide dynamic range based on these digital data stored in the memory 19. The CPU 18 carries out recognition processes from the synthesized signals and various data such as the intensity and the angle of the projected light and calculation processes for the vehicle control, outputting the results of these processes to the vehicle controller 2.

Since the PD 15A is on the reflective mirror 11, the possibility of the laser light from the laser diode 13 entering the PD 15A should not be ignored because if the laser light made direct incidence into the PD 15A, the light receiving circuit 20A would become saturated and it would not be possible to correctly calculate the intensity of the reflected light from a target object. For this reason, it is preferable to adjust the gain such that the first light receiving circuit 20A will not become saturated while the laser diode 13 is projecting light. Although the APD 15B is not at a position where the laser light from the laser diode 13 would make direct incidence, it is still preferable to adjust the gain of the second light receiving circuit 20B so as to prevent it from becoming saturated because the APD 15B is more sensitive than the PD 15A.

Figure 4A:
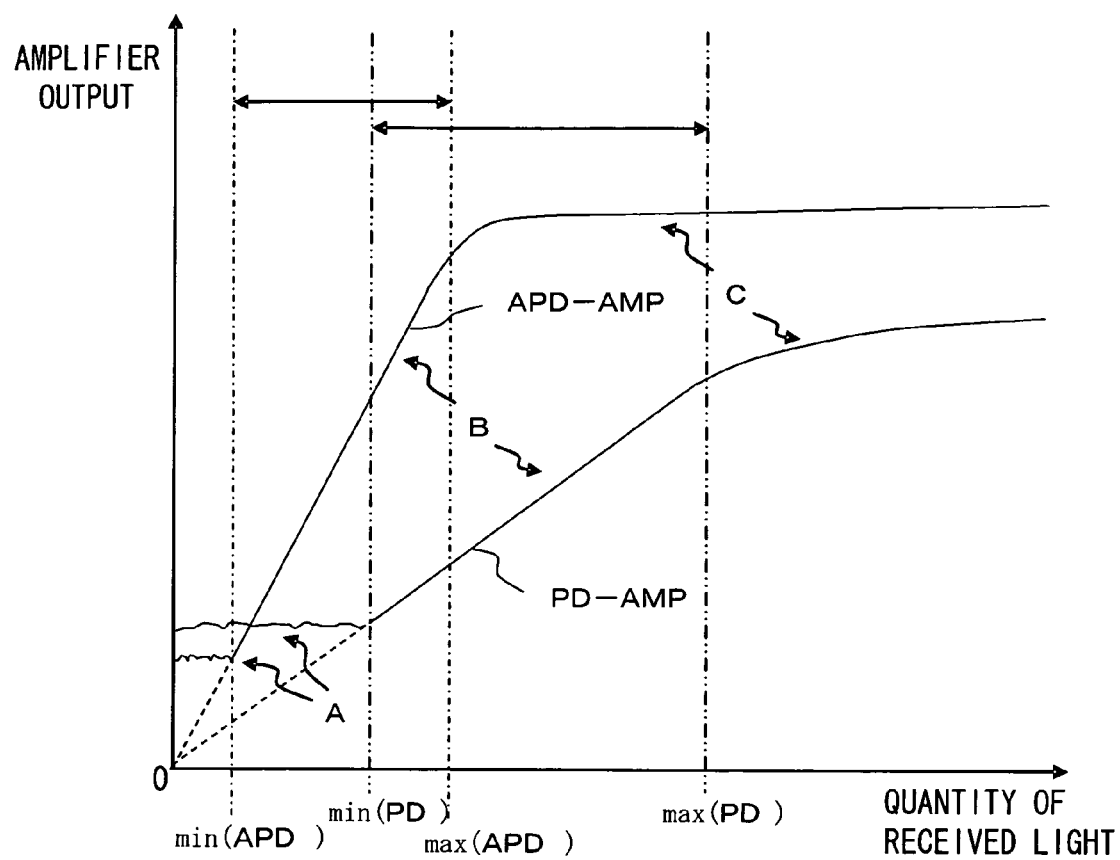
FIGS. 4A and 4B are graphs showing the amplifier outputs and the digital outputs from the light receiving circuits.
Figure 4B:
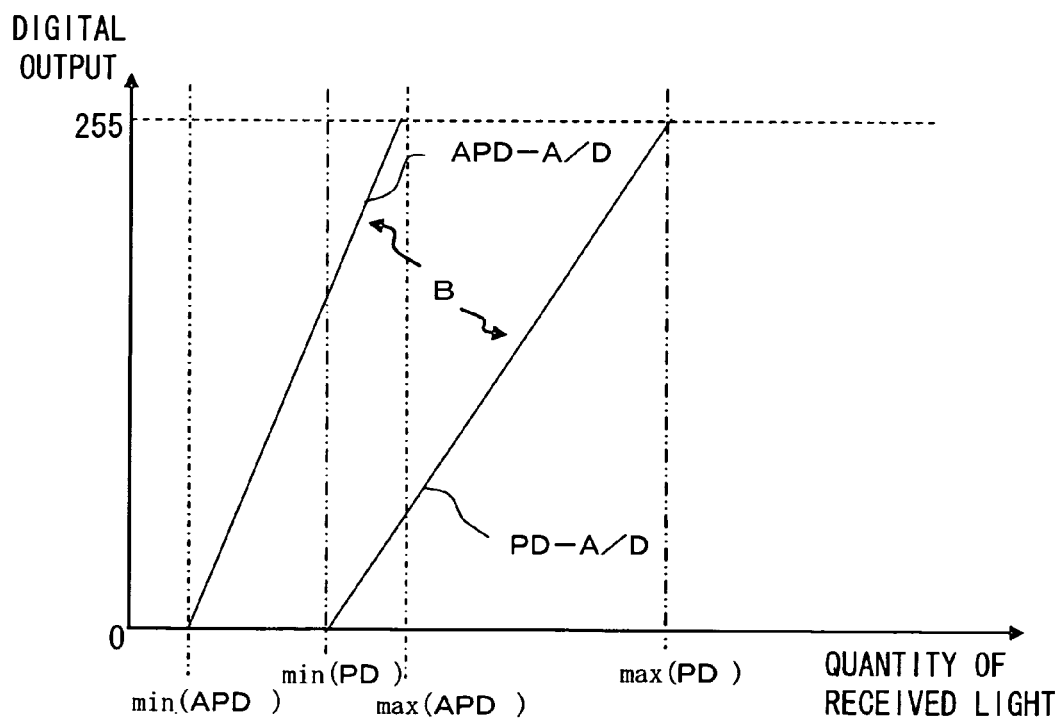

FIG. 4A shows the relationship between the quantities of light received by the PD 15A and the APD and their output signals (or the amplifier outputs from the amplifiers 16A and 16B). FIG. 4B shows the relationship between the quantities of light received by the PD 15A and the APD and the digital output signals from the A/D converters 17A and 17B. In both of the above, the horizontal axis is in the logarithmic scale.

As shown in FIG. 4A, the amplifier outputs (indicated as PD-AMP and APD-AMP) respectively from the amplifiers 16A and 16B each comprise output waveform A of which the main component is the circuit noise, output waveform B which changes linearly and saturated output waveform C. The range of received light quantity wherein the change is linear is the active range of each light receiving circuit. Output waveform A is in the range where the digital output becomes below the threshold level (below min(PD) and min(APD)) by the A/D converter 17A or 17B on the downstream side. Output wave C is in the range where the digital output becomes above the saturation level (above max(PD) or max(APD)) by the A/D converter 17A or 17B on the downstream side.

The digital outputs (indicated as PD-A/D and APD-A/D) shown in FIG. 4B are obtained, as explained above, by converting the amplifier outputs shown in FIG. 4A into digital signals in specified gradations (such as 256 gradations), converting the lower limit of the amplifier output within the range of output waveform B (min(PD) and min(APD)) to zero and converting the upper limit of the amplifier output (max(PD) and max(APD)) to the maximum value of 255.

The upper and lower limits (min(PD), min(APD), max (PD) and max(APD)) of the active ranges of the light receiving circuits 20A and 20B, or those of output waveform B that show a linear change, can be adjusted by controlling the reverse bias voltage of the photodiode and the gains of the amplifiers. According to this invention, therefore, the CPU 18 carries out gain control and bias control to set the active range of each light receiving circuit. More specifically, the CPU 18 sets the active range of the first light receiving circuit 20A at a range of higher brightness from medium to high quantities of received light by controlling the bias of the PD 15A and the gain of the amplifier 16A and the active range of the second light receiving circuit 20B at a range of lower brightness from low to medium quantities of received light by controlling the bias of the APD 15B and the gain of the amplifier 16B. These active ranges are set such that the range of received light quantity (min(APD)-min(PD)) where only the first light receiving circuit 20A operates, the range of received light quantity (min(PD)-max(APD)) where both light receiving circuits 20A and 20B operate and the range of received light quantity (max(APD)-max(PD)) where only the second light receiving circuit 20B operates will be continuous.

The minimum measurable quantity of received light min (PD) by the first light receiving circuit 20A is greater than that min(APD) of the second light receiving circuit 20B. Although the first light receiving circuit 20A cannot detect reflected light with low brightness but the maximum measurable quantity of received light max(PD) by the first light receiving circuit 20A is greater than that max(APD) of the second light receiving circuit 20B such that the first light receiving circuit 20A can detect even reflected light with very high brightness without becoming saturated. As for the second light receiving circuit 20B, since its maximum measurable quantity of received light max(APD) is smaller than that max(PD) of the first light receiving circuit 20A, it becomes saturated more easily by reflected light with high brightness. The second light receiving circuit 20B, however, can detect reflected light with low brightness because its minimum detectable quantity of received light min(APD) is smaller than that min(PD) of the first light receiving circuit 20A.

Figure 5:
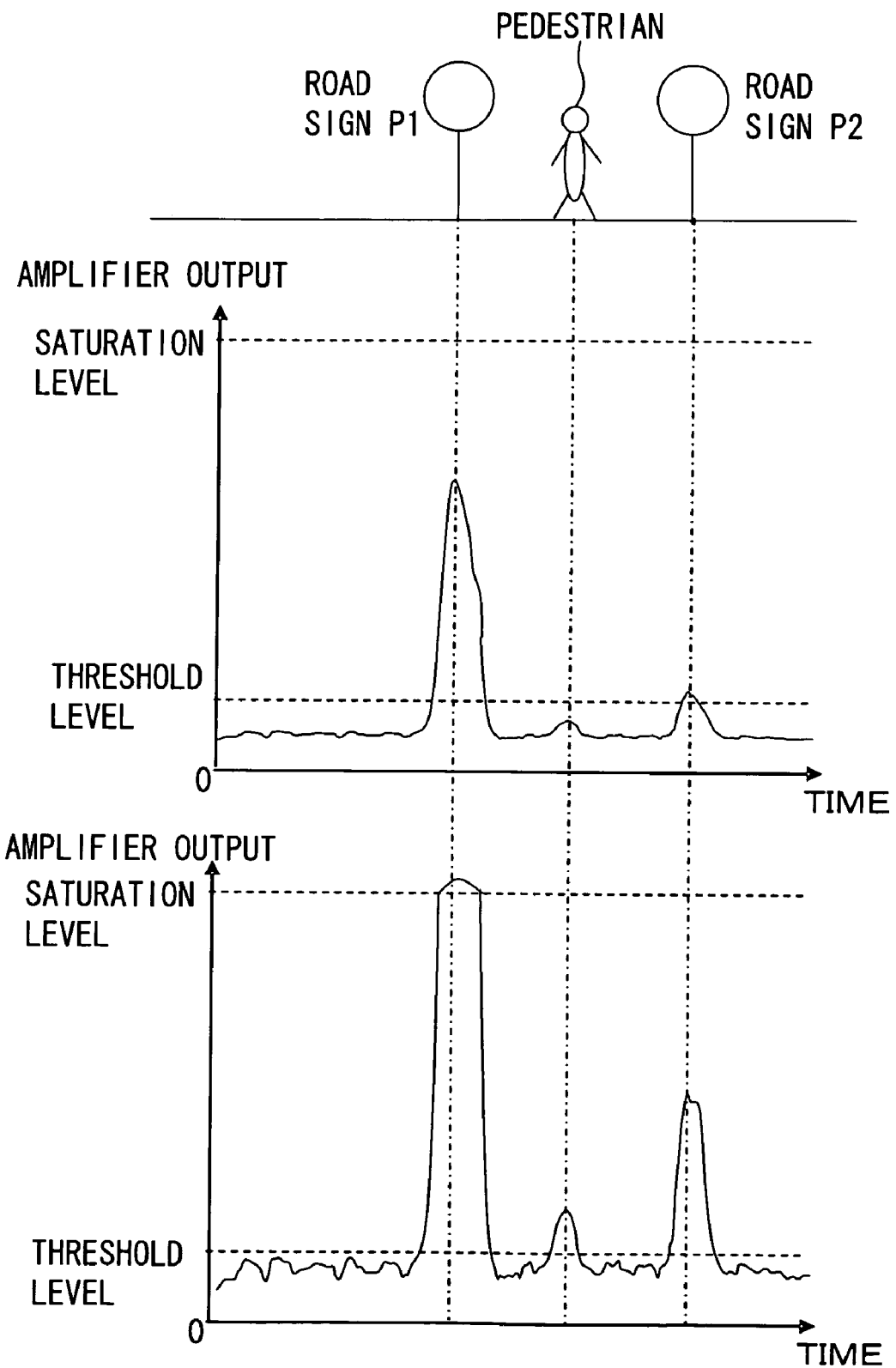
FIG. 5 shows the relationship between the amplifier outputs of the light receiving circuits and positions and reflectivity of objects.

FIG. 5 shows the relationship between the amplifier outputs of the light receiving circuits 20A and 20B and positions and reflectivity of objects. Objects in front of the automobile are shown at the top. The upper graph shows the amplifier output from the first light receiving circuit 20A and the lower graph shows that of the second light receiving circuit 20B. The horizontal axes of FIG. 5 show the time from the moment light is projected and hence also the distance from the automobile. This example represents a situation where there is a (first) road sign P1 with high reflectivity in front of the automobile, a pedestrian with low reflectivity behind this road sign P1 and another (second) road sign P2 with high reflectivity further behind the pedestrian. It is to be reminded now that the quantity of reflected light decreases inversely proportional to the fourth power of the distance to the reflecting object.

The upper graph of FIG. 5 shows the amplifier output of the first light receiving circuit 20A provided with PD and its active range is set at a high-brightness range such that, in this example, the amplifier output corresponding to the reflected light with high brightness from the first road sign P1 with high reflectivity becomes above the threshold level of the A/D converter 17B but below the saturation level. Thus, the first light receiving circuit 20A can detect the peak time at which the detection intensity of the first road sign P1 takes a maximum value.

The amplifier output corresponding to the reflected light with low brightness from the pedestrian becomes lower than the threshold level during a certain period of time. Thus, during this time, the first light receiving device 20A cannot detect the presence of this pedestrian.

As for the second road sign P2 which is farther away, the amplifier output corresponding to reflected light from the second road sign P2 becomes above the threshold level and below the saturation level during a certain time and hence the first light receiving device 20A can detect also the peak time at which the detection intensity of the second road sign P2 reaches a maximum.

The lower graph of FIG. 5 shows the amplifier output of the second light receiving circuit 20B provided with APD and its active range is set at a low-brightness range such that reflected light is detected at a distance where a reflective object is found in front of the automobile. In this example, the amplifier output corresponding to the reflected light with high brightness from the first road sign P1 with high reflectivity becomes higher than the saturation level of the A/D converter 17B. Thus, the second light receiving circuit 20B cannot detect the peak time at which the detection intensity of the first road sign P1 takes a maximum value.

The amplifier output corresponding to the reflected light with low brightness from the pedestrian with low reflectivity becomes above the threshold level while remaining below the saturation level during a certain period of time Thus, during this time, the second light receiving device 20B can detect the peak time at which the detection intensity of the pedestrian takes a maximum value.

As for the second road sign P2 which is farther away, the amplifier output corresponding to reflected from the second road sign P2 becomes above the threshold level wile remaining below the saturation level during a certain time and hence the second light receiving device 20B can detect also the peak time at which the detection intensity of the second road sign P2 reaches a maximum.

If the digital outputs of only the first light receiving circuit 20A were watched, the CPU 18 would not be able to detect any value of the pedestrian over the threshold value and it would be judged that there was no pedestrian. If the digital outputs of only the second light receiving circuit 20B were watched, on the other hand, the CPU 18 would not be able to detect the peak value of the first road sign P1 and would not be able to detect its accurate distance. According to this invention, therefore, the CPU 18 records the digital outputs of both light receiving circuits 20A and 20B at memory areas Mb and Mc of the memory 19 to carry out a signal synthesis which is a process of generating a synthesized signal from digital outputs recorded in the memory 19.

Figure 6:
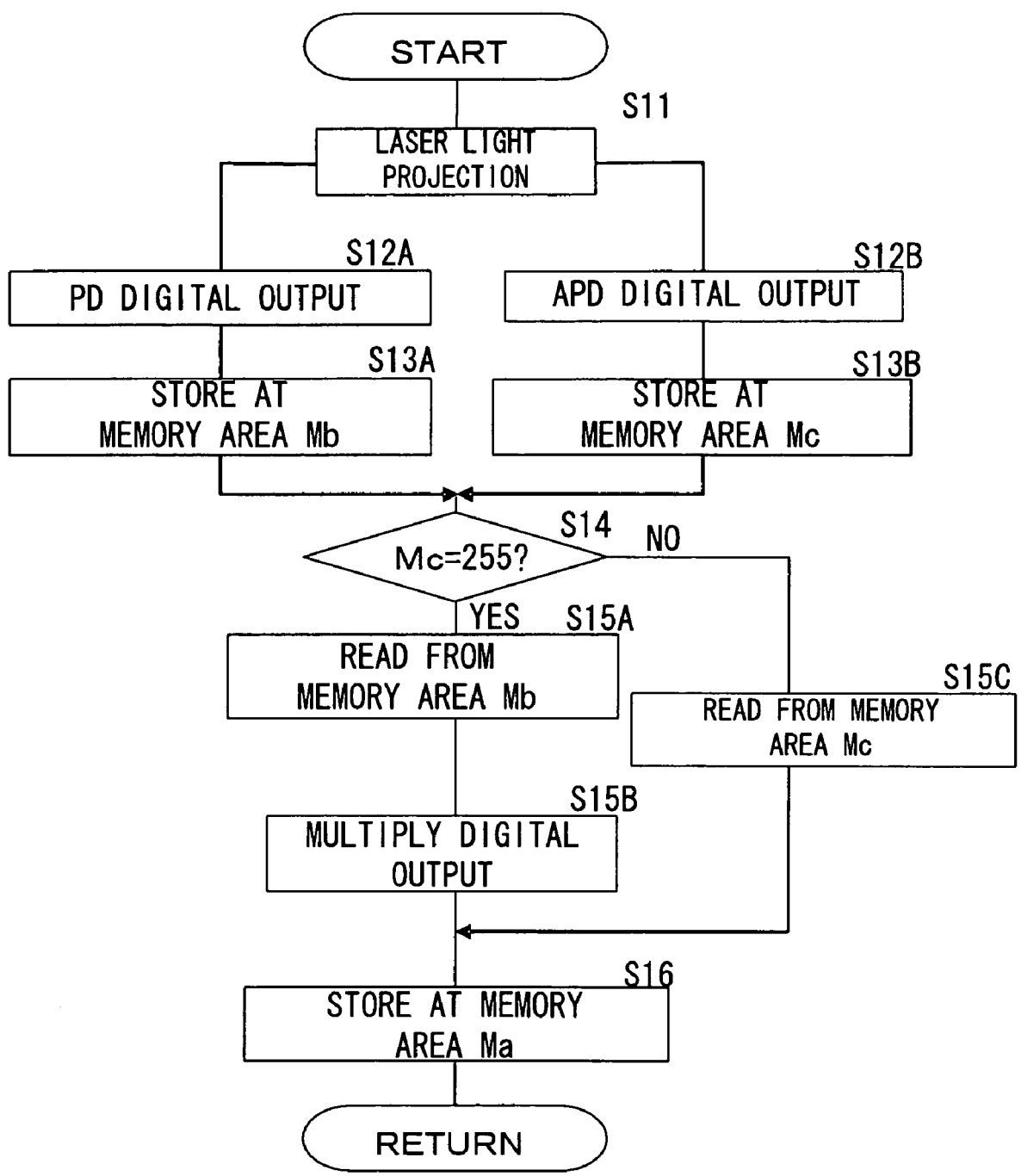
FIG. 6 is a flowchart of the process for the signal synthesis by the CPU.

Next, the flowchart in FIG. 6 is referenced to explain the signal synthesis process carried out by the CPU 18. To start, the CPU 18 instructs the driver 14 to project light (Step S11), causing the laser diode 13 to project laser light.

The CPU 18 has already set a reverse voltage to the PD 15A and the APD 151B such that the light receiving circuits 20A and 20B would have the aforementioned active ranges at the time of the start-up setting and also has set the gains of the amplifiers 16A and 16B. Thus, the light receiving circuits 20A and 20B output digital signals within the aforementioned active ranges according to the quantity of reflected light that is received by the PD 15A and the APD 15B. The CPU 18 inputs these digital signals (Steps S12A and S12B) and records the digital outputs of the light receiving circuits 20A and 20B respectively at memory areas Mb and Mc of the memory 19 (Steps S13A and S13B).

After the digital signals are stored at memory areas Mb and Mc, the CPU 18 judges whether or not the largest value "255" is stored at memory area Mc, or whether it was in the digital output from the APD (Step S14). If any value less than 255 is stored at memory area Mc, (NO in Step S14), it is judged that a signal below the saturation level (such as from the pedestrian or the second road sign P2 in the lower graph of FIG. 5) has been received and the value from memory area Mc (or the digital outputs from APD) is read out (Step S15C). If value 255 is stored at memory area Mc (YES in Step S14), it is judged that a signal on the saturation level has been obtained as digital output from APD (such as from the first road sign P1 in the lower graph of FIG. 5) and value from memory area Mb (or the digital output from PD) is read out (Step S15A).

In the latter situation, the real quantity of reflected light that was received corresponding to the value at memory area Mb (or the digital output from PD) is smaller than that corresponding to the value at memory area Mc (or the digital output from APD). Thus, the CPU 18 multiplies the value at memory area Mb (or the digital output from PD) (Step S15B). If the sensitivity of the first light receiving circuit 20A with PD was set to be $1/16$ of that of the second light receiving circuit 20B with APD, the value at memory Mb is multiplied by 16.

Thereafter, the CPU 18 newly stores this multiplied value or the value at memory area Ma as the value of a synthesized signal at memory area Ma (Step S16). In other words, the value Ma of the synthesized signal may be expressed as follows:

$$Ma = \max(Mb*16, Mc)$$

where Mc is the value by APD and Mb is the value by PD. In summary, a signal appropriately reflecting the intensity distribution of the reflected light can thus be obtained by calculating the synthesized signal because the quantity of received light which saturates APD can be detected by PD and the quantity which is too low to be detectable by PD can be detected by APD with higher sensitivity.

The process described above amounts to the observation process corresponding to one time of laser beam projection and the reception of its reflected light. This process is repeated within the range of search angle of one scan (40°) and after the observation within the entire range of this search angle is completed, a process for recognizing objects detected by the reflected light signals is carried out. This recognition process is a process for judging whether each of the detected objects is a person, a vehicle, a road sign, etc. On the basis of the data on each detected object such as its direction, distance, size and ground-speed, the CPU 18 estimates its kind. For example, the CPU 18 may compare with data recorded in the memory 19 on each kind of objects such as the sizes of road signs and estimate the kind of the detected object if the detected data match the recorded data. The estimated data on the kind of object (such as direction, distance, speed and kind) are transmitted to the vehicle controller 2 and used for cruising control and emergency stopping.

By the processes described above, the CPU 18 obtains from the synthesized signals knowledge of the timing of receiving reflected light. The CPU 18 keeps receiving continuously data on the quantity of received light and these data on the timing are recorded. By measuring the difference between the timing of projecting light and that of receiving light, the CPU 18 can calculate the distances to the objects that reflect light. The timing that indicates the peak in the quantity of received light along the time axis is judged as indicating the position of the object and the distance to that object is thus obtained. Since the CPU 18 can detect the direction in which laser light is projected, the direction to the detected object can also be determined.

The CPU 18 may also be adapted to obtain the speed and direction of motion (or a displacement vector) of a detected object by repeating the detection of the object. If detected objects having the same displacement vector are considered to belong to the same object, its width can be calculated. If a speed sensor (not shown) is connected to the CPU 18 for detecting the speed of motion of the own automobile, the ground speed of the detected object can also be determined. Based on such data, the CPU 18 can determine whether the detected object is a person, a vehicle, etc. to carry out the recognition process.

Having recognized the kind of each detected object, the CPU 18 transmits such recognized data to the vehicle controller 2 on the downstream side. Based on such received data, the vehicle controller 2 functions to carry out a cruising control for following a front going vehicle at a fixed distance or an emergency stopping control for avoiding the contact with a pedestrian. When the own vehicle is stopped suddenly, the braking may not be timely effected unless the radar laser device can measure the distance to the detected object accurately, or the braking may be effected when there is no need for it. In the past, there was no available radar device having a large dynamic range so as to be capable of simultaneously detecting both objects with high reflectivity and low reflectivity. A radar device according to this invention is adapted to simultaneously use APD with high sensitivity and PIN photodiodes with low sensitivity and effectively widen the dynamic range by synthesizing their detected values.

In general, APD has a large variation in sensitivity to received light due to temperature variations. A temperature compensation process is usually carried out by controlling its bias voltage by means of a temperature sensor. Thus, the APD of this invention may also be provided with a temperature sensor to control its reverse bias voltage so as to stabilize the output of the light receiving circuit 20B against temperature variations.

Figure 7:
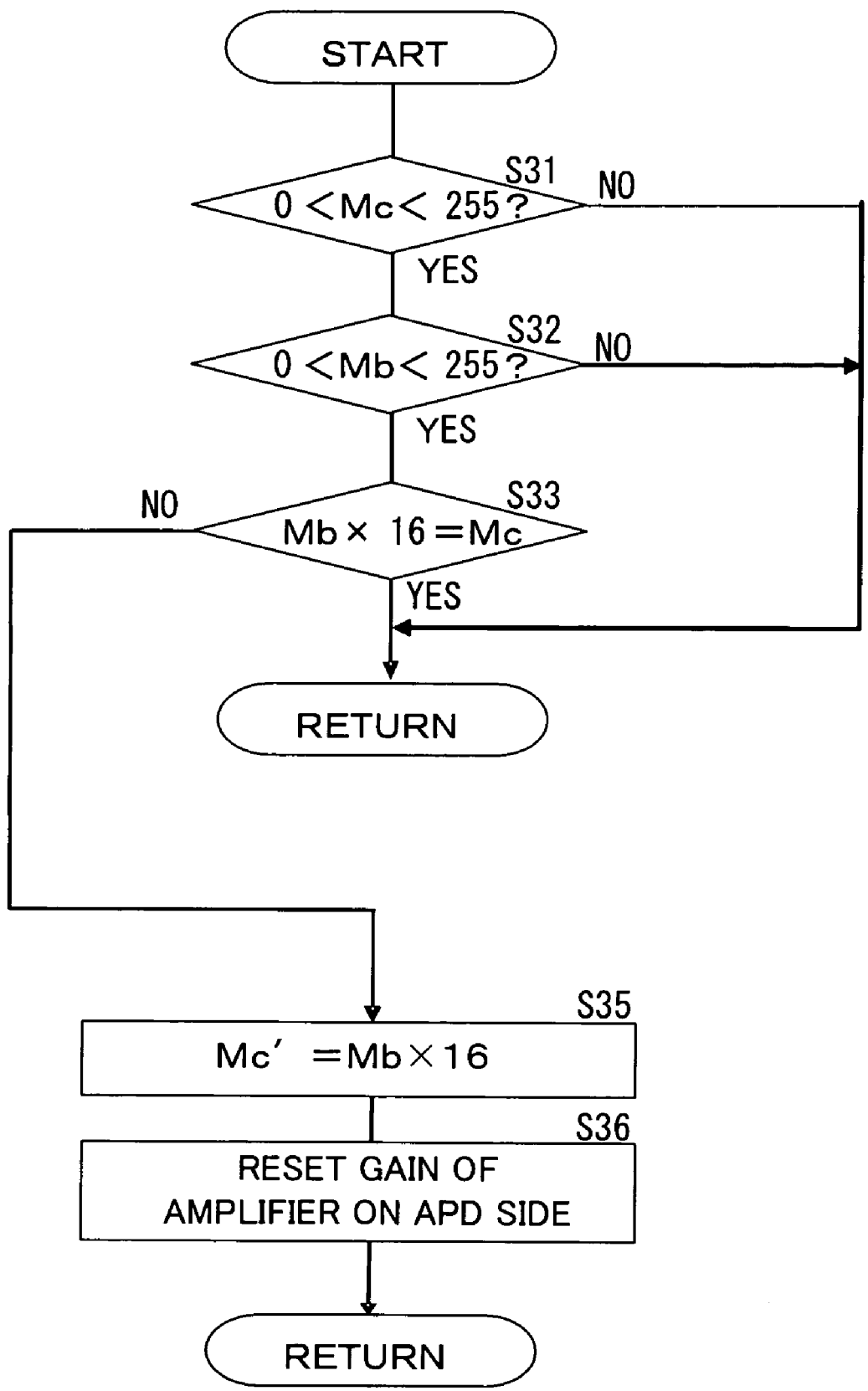
FIG. 7 is a flowchart of the temperature compensation process according to this invention.

According to the present invention, however, the temperature compensation is carried out without using a temperature sensor because the output variations are small in the case of PD and hence the output from PD can be used for the temperature compensation of APD. FIG. 7 is a flowchart of the temperature compensation process according to this invention.

The CPU 18 starts the process by judging whether a value less than the maximum value of 255 and greater than the minimum value 0 is stored at memory area Mc (or the digital output from APD) or not (Step S31). If the stored value is 0 or 255 (NO in Step 31), temperature compensation cannot be carried out and hence the program is terminated.

If the value stored at memory area Mc is greater than 0 and less than 255 (YES in Step S31), the CPU 18 judges next whether a value less than the maximum value of 255 and greater than the minimum value 0 is stored at memory area Mb (or the digital output from PD) or not (Step S32). If the stored value is 0 or 255 (NO in Step 32), temperature compensation cannot be carried out and hence the program is terminated.

Next, the CPU 18 compares the value stored at memory area Mc with the value stored at memory area Mb and determines if the latter is a value obtained by multiplying the former by a specified number (Step S33). If the sensitivity of the first light receiving circuit 20A provided with PD has been set to be $1/16$ of that of the second light receiving circuit 20B provided with APD, the value at memory area Mb (or the digital output from PD) is multiplied by its converse, or 16, and compared.

If these values are the same (YES in Step S33), both light receiving circuits 20A and 20B may be considered to be operating normally. If they are not the same (NO in Step S33), it may be judged that the sensitivity of the second light receiving circuit 20B has been affected by a temperature variation and the subsequent compensatory steps are carried out.

The CPU 18 firstly estimates a digital output if a temperature compensation step is accurately carried out by the second light receiving circuit 20B on the basis of the digital output from the first light receiving circuit 20A with PD (Step S35). Specifically, the value obtained by multiplying the value stored at memory area Mb by a specified factor is used as the digital output of the second light receiving circuit 20B with APD if temperature compensation has been carried out correctly. If the sensitivity of the first light receiving circuit 20A provided with PD has been set to be $1/16$ of that of the second light receiving circuit 20B provided with APD, the value obtained by multiplying the value at memory area Mb (or the digital output from PD) by 16 is determined as the predicted value Mc'.

Next, the predicted value Mc' is compared with real value at memory area Mc, and the CPU 18 calculates the reverse bias voltage of the APD 15B which would be necessary to change Mc to Mc' and resets the reverse bias voltage (Step S36). In summary, the temperature compensation can be carried out without using any temperature sensor.

The invention has been described above with reference to only particular embodiments but this is not intended to limit the scope of the invention. Many modifications and variations are possible within the scope of the invention. Although the MEMS device was made in the gimbal structure in the description above such that the main body of the reflective mirror 11 will be caused to oscillate by means of the piezoelectric elements 103 formed on the mobile frame 102, the MEMS mirror main body 11 containing PIN photodiodes 111 may be caused to oscillate by means of an external mechanism including a motor.

If the MEMS mirror is formed with a micro-mirror device as shown in FIG. 3B, it is possible to effect the oscillating motion of the laser beam in the horizontal direction by the oscillation of the mirror as a whole while the vertical scan direction is switched in two steps diagonally upward and downward by the oscillations of the micro-mirror by means of each element.

Although the invention was shown above as applied to an automobile, it goes without saying that the invention can be applied equally well to railroad cars and ships. Although the invention was explained above by way of a laser device using infrared light, neither is this intended to limit the scope of the invention. The invention is also applicable to laser devices using visible light to scan a front area.

The MEMS mirror device of this invention can be used not only as a reflective mirror of a laser device but also for a variety of other purposes as a device not only for reflecting light but also for observing the quantity of this light in parallel.

What is claimed is:

1. An MEMS mirror device comprising:
a light projecting part that generates laser light;
a first light receiving part that converts received light into a signal;
an optical system that uses an MEMS mirror and serves to form said laser light generated by said light projecting part into a beam, to project said beam in a specified search direction, to receive reflected light from said search direction and to lead said received light to said first light receiving part, said MEMS mirror having:
a semiconductor substrate having a surface that is mirror-finished by a semiconductor process and has areas arranged in a matrix form;
a plurality of semiconductor elements each formed by a semiconductor process as a mirror element with a mirror surface in different one of said areas; and
at least one photodiode each at different one of said areas on said surface;
a second light receiving part including said at least one photodiode formed on said MEMS mirror and having a photosensitive range for reflected light with higher brightness than the photosensitive range of said first light receiving part; and
a synthesizing part that outputs a synthesized signal formed by synthesizing outputs from said first light receiving part and said second light receiving part.

2. A radar device comprising:
a light projecting part that generates laser light;
a first light receiving part that converts received light into a signal;
an optical system that uses an MEMS mirror and serves to form said laser light generated by said light projecting part into a beam, to project said beam in a specified search direction, to receive reflected light from said search direction and to lead said received light to said first light receiving part, said MEMS mirror having a semiconductor substrate having a surface that is mirror-finished by a semiconductor process and at least one photodiode on said surface;
a second light receiving part including said at least one photodiode formed on said MEMS mirror and having a photosensitive range for reflected light with higher brightness than the photosensitive range of said first light receiving part; and
a synthesizing part that outputs a synthesized signal formed by synthesizing outputs from said first light receiving part and said second light receiving part.

3. The radar device of claim 2 wherein said first light receiving part includes an avalanche photodiode and each of said at least one photodiode is a PIN diode.

4. The radar device of claim 2 further comprising means for driving said MEMS mirror device to thereby cause said search direction to oscillate.

5. A radar device comprising:
a light projecting part that generates laser light;
a first light receiving part that converts received light into a signal;
an optical system that uses an MEMS mirror and serves to form said laser light generated by said light projecting part into a beam, to project said beam in a specified search direction, to receive reflected light from said search direction and to lead said received light to said first light receiving part, said MEMS mirror having a semiconductor substrate having a surface with areas arranged in a matrix form, a plurality of semiconductor elements each formed by a semiconductor process as a mirror element with a mirror surface in different one of said areas, and at least one photodiode each at different one of said areas;
a second light receiving part including said at least one photodiode formed on said MEMS mirror and having a photosensitive range for reflected light with higher brightness than the photosensitive range of said first light receiving part; and
a synthesizing part that outputs a synthesized signal formed by synthesizing outputs from said first light receiving part and said second light receiving part.

6. The radar device of claim 5 wherein said first light receiving part includes an avalanche photodiode and each of said at least one photodiode is a PIN diode.

7. The radar device of claim 5 further comprising means for driving said MEMS mirror device to thereby cause said search direction to oscillate.

8. The radar device of claim 5 further comprising means for causing each of micro-mirror elements of said MEMS mirror device to oscillate to thereby cause said search direction to oscillate.

9. A radar device comprising:
- a light projecting part that generates laser light;
- a light projecting lens that converges said laser light generated by said light projecting part to form said generated laser light into a beam;
- a reflective mirror for reflecting said converged laser light formed into said beam to thereby project said beam in a specified search direction and for reflecting returning light from said search direction;
- a light receiving lens for converging said returning light reflected by said reflective mirror;
- a scanning part having a mobile part and serving to move said beam in a scanning manner by driving said mobile part;
- a first light receiving part for receiving said returning light converged by said light receiving lens and converting said received returning light into a signal;
- a second light receiving part including at least one photodiode formed on said reflective mirror and serving to receive said returning light from said search direction and to convert said received returning signal into a signal; and
- a synthesizing part that outputs a synthesized signal formed by synthesizing output signals from said first light receiving part and said second light receiving part.

10. The radar device of claim 9 wherein said second light receiving part has a photosensitive range for said returning light with higher brightness than the photosensitive range of said first light receiving part.

11. The radar device of claim 9 wherein said reflective mirror is an MEMS mirror, said MEMS mirror comprising:
- a semiconductor substrate having a surface that is mirror-finished by a semiconductor process; and
- said at least one photodiode.

12. The radar device of claim 11 wherein said first light receiving part includes an avalanche photodiode and each of said at least one photodiode formed on said reflective mirror is a PIN diode.

13. The radar device of claim 12 wherein said synthesizing part compares the value of the output signal from said first light receiving part and a multiplied value of the output signal from said second light receiving part and determines a reverse bias voltage to be applied to said avalanche photodiode for making the value of the output signal from said first light receiving part to become equal to said multiplied value.

14. The radar device of claim 9 wherein said reflective mirror is an MEMS mirror, said MEMS mirror comprising:
- a semiconductor substrate having a surface with areas arranged in a matrix form, a plurality of semiconductor elements each formed by a semiconductor process as a mirror element with a mirror surface in different one of said areas, and
- said at least one photodiode each at different one of said areas.

15. The radar device of claim 14 wherein said scanning part moves said beam in said scanning manner by causing the mirror elements of said MEMS mirror to oscillate.

16. The radar device of claim 9 wherein said first light receiving part includes an avalanche photodiode and each of said at least one photodiode formed on said reflective mirror is a PIN diode.

17. The radar device of claim 16 wherein said synthesizing part compares the value of the output signal from said first light receiving part and a multiplied value of the output signal from said second light receiving part and determines a reverse bias voltage to be applied to said avalanche photodiode for making the value of the output signal from said first light receiving part to become equal to said multiplied value.

18. The radar device of claim 9 wherein said light receiving lens has a light receiving area that is larger than the light receiving area of said at least one photodiode.

19. The radar device of claim 9 wherein said light receiving lens has a light receiving area that is larger than the light receiving area of said light projecting lens.

* * * * *